United States Patent [19]
Jones et al.
[11] Patent Number: 4,725,489
[45] Date of Patent: Feb. 16, 1988

[54] DISPOSABLE SEMI-MOIST WIPES

[75] Inventors: Jack D. Jones, Guttenberg; Ashwin Gandhi, Roselle Park; Arlette Girgis, Kearny, all of N.J.

[73] Assignee: Airwick Industries, Inc., Carlstadt, N.J.

[21] Appl. No.: 938,014

[22] Filed: Dec. 4, 1986

[51] Int. Cl.$^4$ .............................................. B32B 27/00
[52] U.S. Cl. .................................... 428/289; 428/290
[58] Field of Search ................................ 428/290, 289

[56] References Cited

U.S. PATENT DOCUMENTS 4,624,890 11/1986 Lloyd et al. ....................... 428/290

Primary Examiner—Marion C. McCamish
Attorney, Agent, or Firm—Frederick H. Rabin

[57] ABSTRACT

A disposable article for light cleaning of hard surfaces comprises a non-woven substrate, preferably of cellulosic or cellulose-containing material, carrying an aqueous cleaning composition loaded onto the substrate at a level less than about 75%, preferably less than 50%, of its maximum absorbence capacity. The aqueous composition comprises one or more nonionic surfactants, one or more anionic surfactnats or a mixture of nonionic and anionic surfactants, a water miscible solvent for oils, (preferably a low molecular weight alcohol), and an alkalinity agent such as ammonium hydroxide in sufficient amount to maintain the pH of the extracted solution within the range of 8 to 12.

29 Claims, No Drawings

DISPOSABLE SEMI-MOIST WIPES

FIELD OF THE INVENTION

This invention relates generally to disposable household articles suitable for light duty cleaning of hard surfaces, ranging from ones with high gloss to those with none at all. More particularly, it relates to semi-moist wipers which comprise a substrate impregnated, at a level significantly below its maximum absorbence capacity, with an aqueous composition containing as essential ingredients one or more solvents and/or one or more surfactants. These wipes are intended principally for touch-up or light duty cleaning of bathroom surfaces such as counter tops, sinks, tile, plumbing fixtures, and toilet seats.

BACKGROUND OF THE INVENTION

Traditionally, hard surfaces such as porcelain-finish sinks or bathtubs, counter tops, and tile walls, have been cleaned by various compositions such as a particulate detergent, from which the user prepares an aqueous solution or suspension, or a liquid composition which contains a suitable solvent such as water, an organic solvent, or mixture thereof and one or more surfactants. These compositions can provide satisfactory soil removal from hard surfaces, but they often leave behind residues once the solvent medium has been permitted to evaporate or has been wiped off. In particular, if the surface is left to dry naturally, there often result residues in the form of dull streaks, rather than the desired bright and shiny surfaces. Such residues have to be removed by polishing with a dry cloth.

Where one is seeking to do heavy duty cleaning, the requirement of a two-step process for restoration of bright shiny surfaces is not unacceptable. However, when only a light-duty cleaning is necessary—such as, for example, removal of minor bathroom soils—a two-step process is not desirable. Where the surface to be cleaned is only lightly soiled, it would be most advantageous to be able to clean the surface with a single application and to have it dry naturally to a streak-free bright and shiny condition. The principal object of this invention is to develop a product of this type.

There are numerous products on the market comprising absorbent substrates impregnated with liquid compositions. Some of these are designed for personal use and these include articles such as pre-moistened towelettes individually wrapped in moisture impervious sealed envelopes. Similarly designed products, which generally require pre-wetting prior to use, are sold as hard surface cleaners for household and industrial use. The principal utility for such products is in areas such as floors or non-shiny surfaces where a certain amount streaking is acceptable. However, where such products are used on shiny surfaces, such as those made of porcelain or having a porcelain-like finish, an additional polishing step is often required in order to prevent streaking or to remove streaks. This streaking or filming problem has heretofore prevented the commercial development of a one-step disposable wipe for household use on shiny surfaces.

In liquid-containing wiping article of this type, the substrate must function as reservoir which first distributes the liquid on the surface to be cleaned and then collects the dirt and oils from the surface. Because of this dual function, it is obviously not possible to have a substrate which is fully or nearly fully loaded to its absorbence capacity with liquid because, if this were the case, the substrate could not function as a collector of dirt and oils, particularly if the surface to be wiped has some standing liquid. In designing a product which will satisfactorily work as a one-step disposable wipe and not leave behind film or streaks, there are number of variables to manage. These include the composition of the substrate itself, the absorbent characteristics of the substrate, the loading level of liquid onto the substrate, the components of the liquid composition, the pH of the liquid, etc. All of these factors are interrelated and it has been found that close control is necessary in order to obtain a satisfactory product.

DESCRIPTION OF THE PRIOR ART

Rentz U.S. Pat. No. 995,940 discloses impregnated paper for cleaning hard surfaces such as mirrors or windows. The paper is impregnated in two-steps: the first step putting in water, salt and calcium carbonate; the second step putting in a mixture of gasoline and kerosene. The impregnated paper is allowed to dry before use and this drying gives the product some liquid absorbing capacity. However, the presence of hydrocarbon solvents would result in excessive streaking of the surface.

Miller U.S. Pat. No. 2,980,941 relates to cleaning sheets, which may be paper or textile fabric. Embedded into the sheet are minute pressure-rupturable capsules which contain organic solvents for dirt and grease and particles for absorbing liquid and soil. The article is used by rubbing it against a hard surface, thereby causing the capsules to rupture. Suggested soil removing liquids include gasoline, kerosene, light lubricating oil, xylene, etc. Although these are volatile substances, they are not suitable for use in a household environment and, furthermore, would not provide streak-free or film-free results.

Schwuger U.S. Pat. No. 3,954,642 discloses impregnated textile fibrous materials for cleaning purposes. The fiber structure itself includes salt-forming carboxyl groups introduced into the structure by either a process of carboxymethylation (if the fiber structure is composed of cellulose fibers) or by a process of graft polmerization (if the fiber structure is composed principally of vinyl polymers). The function of these carboxyl groups is to act as ion exchangers, i.e. to sequester oil-containing impurities. The fibrous structure is also impregnated with a polyalkoxylated nonionic substance serving as a surface active agent. These cleaning cloths are disclosed as being effective on greasy surfaces. There is no indication, however, of any liquid loading limitations and it is quite likely that a separate wiping operation would have to follow its use. Furthermore, the substrate material is a textile fibrous material not designed for one time use.

Muoio U.S. Pat. No. 3,965,518 discloses a self-polishing wipe for application of polish to furniture. The substrate is a specific non-woven cellulosic paper material which is loaded with liquid furniture polish to a level no more than 50% on its absorbence capacity. Since the product is a furniture polishing material, it is obviously desired that use of the material leave behind a film. This is in direct contrast to the objective of the instant invention, which is to produce a wipe which does not leave a film behind.

Hermann U.S. Pat. No. 3,965,519 discloses disposable floor wipes which deposit an aqueous coating onto the floor. The carrier substrate is a relatively heavy paper with a high liquid capacity, although it is only partially loaded with liquid. The articles disclosed in this patent are designed to leave behind a film coating, which is impregnated into the substrate; this again is in clear contrast to the objectives of the instant invention.

Meitner U.S. Pat. No. 4,307,143 discloses wipes for heavy duty cleaning. The substrate is an embossed melt-blown polypropylene web into which is loaded a wetting agent which must be either dioctyl sodium sulfosuccinate or isooctyl phenypolyethoxyethanol. The embossing of the web is designed to result in high water and oil absorption and, at the same time, to provide an uneven surface as an aid to cleaning. The disclosed products are indicated to be useful in various industrial applications and there is no indication that filming and streaking would be avoided.

Barby U.S. Pat. No. 4,448,704 discloses a detergent-containing article for wiping hard surfaces which comprises a substrate into which is loaded a homogeneous aqueous composition. The loading level is expressed in terms of weight of the aqueous composition and weight of the substrate, and it is readily apparent that the disclosed products are loaded to a level which is considerably below their maximum absorbence capacity. The preferred embodiments of the invention require the presence of a film-forming resin and it is stated that use of the product results in a streak-free surface. Such streak-free results are said to be due to the requirement that the substrate be pre-washed prior to impregnation with either liquid or resin forming material. Although U.S. Pat. No. 4,448,704 teaches the attainment of streak-free finish, this can be attained only by modification—i.e., pre-washing—of the substrate material, and, furthermore, the preferred embodiment of the invention leaves behind a resinous film. Thus, the cleaning articles produced would not fulfill the objectives of the instant invention.

SUMMARY OF THE INVENTION

This invention provides a disposable article for light duty cleaning of hard surfaces which comprises a non-woven substrate carrying an aqueous composition loaded onto the substrate at a level considerably less than its maximum absorbence capacity. The substrate consists essentially of cellulosic material, rayon, polyolefins, polyester, nylon or mixtures thereof and is preferably a cellulosic material. The aqueous solution comprises one or more nonionic surfactants, one or more anionic surfactants, or a mixture of anionic and nonionic surfactants, one or more water miscible solvents for oils and dirt, preferably a low molecular weight alcohol, and, as an alkalinity agent, ammonia or an alkali metal hydroxide in an amount sufficient so that the extracted pH of the solution is within the range of 8 to 12, preferably 9 to 11. Additionally, the solution may contain disinfectants, colorant, fragrance, buffering agents, etc.

DETAILED DISCLOSURE

The semi-moist wipes of this invention comprise an absorbent substrate carrying a aqueous liquid composition which is impregnated into the substrate. These wipes are useful for one-step removal of bathroom soil. By "bathroom soil" is meant the various oils, dirt and other particulate material left behind on shiny surfaces as a result of ordinary domestic use. Those include such diverse matter as spilled make-up, soap scum, shaving residue, urine, hard water spots, hair spray, film resulting from cigarette smoke, ashes, toothpaste, finger prints, after-shave lotions, colognes and perfumes, hair oil, etc. The articles of this invention thus are intended for "interim" or "touch up" cleaning, rather than for heavy duty cleaning. Their contemplated use is on sinks, counter tops, mirrors, ceramic tile, faucets, toilet seats, bowl rims, etc., principally on sinks, tile, toilet exterior surfaces, counter tops and faucets. They are not primarily contemplated for such heavy duty use as cleaning floors, or removal of heavy soap scum build-up in shower stalls or bath tubs, although they can of course be used to remove a moderate amount of bathroom soil from a recently-cleaned floor, shower stall, or tub.

The substrate is a flat flexible non-woven sheet having sufficient wet strength and consisting essentially of cellulosic material, rayon, polyolefins such as polyethylene, polypropylene or ethylene-propylene copolymer, polyester (polyethylene terephthalate), nylon and mixtures thereof. Preferably, the substrate is a cellulosic material from natural sources (wood pulp, cotton) or a blend of such cellulosic material with one or more of the foregoing synthetic materials. Its basis weight and liquid retention characteristics should be within specified ranges. Since the substrate must act as a reservoir for both an aqueous cleaning solution and oily residue removed from a surface, the substrate must exhibit both hydrophilic and oleophilic characteristics. The fibers may be processed into the non-woven substrate by various well-known methods such as, for example, air laying, hydraulic lacing or (where composed principally of suitable synthethic fibers) thermal bonding.

The non-woven cellulose-containing substrate which is preferably used in the practice of this invention, may be a fibrous sheet material having a basis weight between about 1 and about 4. 5 ounces per square yard (about 34 and 153 grams per square meter), preferably from 1.5 to 3.5 ounces per square yard (about 51 to 119 grams per square meter). Particularly suitable are substrates consisting essentially of cellulosic materials having a basis weight of about 2.5 ounces per square yard (about 85 grams per square meter). The substrate should have a sufficiently closed structure so that no contact occurs between the user's fingers and the surface being wiped. The higher the basis weight of the paper, the more porous the structure can be without allowing such undesirable hand contact. To avoid such problems, sheets of larger area can be prepared and the consumer directed to use them in folded or balled condition. However, since the wipes of this invention are designed for light duty cleaning only, it is preferable that they have a basis weight of at least 2 ounces per square yard (68 grams per square meter) and that they be prepared in the form of sheets of from about 70 to about 100 square inches (about 450 to about 650 square centimeters), preferably 80 to 90 square inches (about 516 to about 580 square centimeters). Sheets of about 8 inches by 10½ inches (about 20 cm by 27 cm) are particularly useful. For sheets of this size, a tight closed structure is desirable.

Also suitable are blends of cellulosic material with the above-mentioned synthetic materials such as, for example, blends of cellulosic material with rayon, with polypropylene, with both polypropylene and rayon, and with polyester. Preferred blends are those in which the cellulosic material comprises at least about 40 weight percent of the blend.

Also of interest are non-woven sheets composed of fiber blends of rayon (regenerated cellulose) and one or more of the synthetic fibers, i.e. polyolefin, polyester, and nylon. Blends can offer advantages of economy, tactile properties, and/or a better balance of hydrophilic and oleophilic properties. If the nature of the soil to be removed is primarily an oil, then a substrate with enhanced oleophilic properties would contribute to superior pickup and retention of this class of soils. The use of one or more synthetic fibers in the blend is particularly valuable in this regard. For example, such a substrate may be composed of 40–80 percent rayon with the balance being 20–60 percent of polyester or of a polyolefin such as polyethylene, polypropylene or ethylene-propylene copolymer.

The maximum quantity of a liquid which can be carried by an absorbent substrate is determined by the total capacity of the substrate to carry said liquid without dripping. This quantity can be termed "absorbence capacity" and, since this invention is concerned with liquid compositions whose principal constituent is water, absorbence capacity for the substrates usable in with this invention can be regarded as identical to their maximum liquid loading level for water. For use in this invention, these substrates should have an absorbence capacity by weight for water at least 200% of the weight of the substrate. Advantageously, the absorbence capacity should be from about 300% to about 1200%, preferably from about 600% to 1000%.

The substrates used in the practice of this invention should be substantially free of any materials which would be leached out by the liquid composition and deposited on the wiped surface as streaks. Therefore, care must be taken in choosing substrates free of such potential "contaminants" as particular bonding agents, size, clays, fluorescent whitening agents, emulsifiers, or other inappropriate processing materials. Suitable products for substrates include the following:

mono- and dimethyl-, propyl, isopropyl, butyl, and isobutyl ethers of di- and triethylene glycol and of analogous propylene glycols may also be used. Such glycols and glycol ethers have from 2 to 8 carbon atoms, and include particularly butyl Cellosolve. Also useable are volatile silicones, particularly in admixture with one or more of the foregoing solvents. The preferred solvents are $C_2$ and $C_3$ aliphatic alcohols, especially ethanol and isopropanol. Such solvents, which can include mixtures, should be present in an amount ranging from about 0.2 to about 25 weight percent, preferably from 9 to 18 weight percent, of the aqueous solution.

Surfactants useable in the aqueous composition are nonionic and anionic surfactants. The function of the surfactant is to disperse bathroom soils when the moistened wipe contacts the soiled area and to enhance their absorption into the substrate.

Preferred nonionic surfactants include the condensation products of ethylene oxide with a hydrophobic (oleophilic) polyoxyalkylene base formed by the condensation of propylene oxide with propylene glycol. The hydrophobic portion of these compounds has a molecular weight sufficiently high so as to render it water-insoluble. The addition of polyoxyethylene moieties to this hydrophobic portion increases the water-solubility of the molecule as a whole, and the liquid character of the product is retained up to the point where the polyoxyethylene content is about 50% of the total weight of the condensation product. Examples of compounds of this type include certain of the commercially-available Pluronic surfactants (BASF Wyandotte Corp.), especially those in which the polyoxypropylene ether has a molecular weight of about 1500–3000 and the polyoxyethylene content is about 35–55% of the molecule by weight, i.e. Pluronic L-62.

Other useful nonionic surfactants include the condensation products of $C_8$–$C_{22}$ alkyl alcohols with 2–50 moles of ethylene oxide per mole of alcohol. Examples

| SUBSTRATE TYPE | BASIS WT. | FIBER MIX | TRADE NAME | MANUFACTURER |
|---|---|---|---|---|
| Thermally bonded | 2.8 oz/yd$^2$ (96 g/m$^2$) | 25/75 Polypropylene/Rayon | Novonette Grade #149-807 | Kendall Co. |
| Thermally bonded | 2.2 oz/yd$^2$ (75 g/m$^2$) | 25/75 Polypropylene/Rayon | Novonette Grade #149-705 | Kendall Co. |
| Thermally bonded | 3.7 oz/yd$^2$ (124 g/m$^2$) | 25/69/6 Polypropylene/Rayon/ Cellulose (Cotton) | Novonette Grade #149-705 | Kendall Co. |
| Nonwoven (formed by chemical entanglement) | 4.2 oz./yd$^2$ (144 g/m$^2$) | 100 Cellulose (Cotton) | Webril-R-2401 | Kendall Co. |
| Hydraulically interlaced fibers | 2.3 oz./yd$^2$ (78 g/m$^2$) | 70/30 Rayon/polyester | Sontara 8423 | Du Pont |
| Hydraulically interlaced fibers | 2.0 oz./yd$^2$ (68 g/m$^2$) | 55/45 Cellulose (Wood pulp)/ polyester | Sontara 8801 | Du Pont |
| Air lay | 2.5 oz./yd$^2$ (85 g/m$^2$) | 100 Cellulose (wood pulp) | 852 | Fort Howard |
| Thermally bonded | 20 oz./yd$^2$ (68 g/m$^2$) | 50/50 rayon/polypropylene | Experimental grade | Scott Paper Company |

The liquid cleaning composition carried by the substrate is in the form of a homogeneous aqueous solution which contains, in addition to water, one or more water-miscible solvents for oils and dirt, one or more surface active agents, and sufficient ammonium or alkali metal hydroxides so that the pH of the extracted liquid is 8 to 12, preferably between 9 and 11.

Typical examples of suitable solvents are the lower aliphatic water-miscible alcohols having from 1 to 4 carbon atoms such as ethanol, propanol, isopropanol, butanol, etc. Other alcohols, such as tetrahydrofurfurol, may also be used. Glycols such as ethylene- and propylene glycol and glycol ethers (Cellosolve), such as the of compounds of this type include the condensation products of $C_{11}$–$C_{15}$ secondary alkyl alcohols with 3–50 moles of ethylene oxide per mole of alcohol which are commercially-available as the Poly-Tergent SLF series from Olin Chemicals or the Tergitol series from Union Carbide, i.e. Tergitol 25-L-7, which is formed by condensing about 7 moles of ethylene oxide with a $C_{12}$–$C_{15}$ alkanol.

Other nonionic surfactants which may be employed include the ethylene oxide esters of $C_6$–$C_{12}$ alkyl phenols such as (nonylphenoxy)polyoxyethylene ether. Particularly useful are the esters prepared by condensing about 8–12 moles of ethylene oxide with nonylphenol, i.e. the Igepal CO series (GAF Corp.).

Further preferred nonionic surface active agents include alkyl polyglycosides (APG), derived as a condensation proudct of dextrose (D-glucose) and a straight or branched chain alcohol. The glycoside portion of the surfactant provides a hydrophile having high hydroxyl density which enhanes water solubility. Additionally, the inherent stability of the acetal linkage of the glycoside provides chemical stability in alkaline systems. Furthermore, unlike some nonionics, alkyl polyglycosides have no cloud point, allowing one to formulate without a hydrotrope, and these are very mild, as well as readily biodegradable nonionic surfactants. This class of surfactants is available from Horizon Chemical under the trade names of APG-300, APG-350, APG-500, and APG-500.

Another useful class of nonionic surfactant is the silicone-glycol copolymers. These surfactants are prepared by adding poly(lower)alkylenoxy chains to the free hydroxyl groups of dimethylpolysiloxanols and are available from the Dow Corning Corp as Dow Corning 190 and 193 surfactants (CTFA name: dimethicone copolyol.) These surfactants function, with or without any volatile silicones used as solvents, to control foaming produced by the other surfactants, and also impart a shine to metallic, ceramic, and glass surfaces.

Anionic surfactants suitable due to their high detergency include anionic detergent salts having alkyl substituents of 8 to 22 carbon atoms such as the water-soluble higher fatty acid alkali metal soaps, e.g., sodium myristate and sodium palmitate. A preferred class of anionic surfactants encompasses the water-soluble sulfated and sulfonated anionic alkali metal and alkaline earth metal detergent salts containing a hydrophobic higher alkyl moiety (typically containing from about 8 to 22 carbon atoms) such as salts of higher alkyl mono- or polynuclear aryl sulfonates having from about 1 to 16 carbon atoms in the alkyl group (e.g., sodium dodecylbenzenesulfonate, magnesium tridecylbenzenesulfonate, lithium or potassium pentapropylenebenzenesulfonate). These compounds are available as the Bio-Soft series, i.e. Bio-Soft D-40 (Stepan Chemical Co.).

Other useful classes of anionic surfactants include: the alkali metal salts of alkyl naphthalene sulfonic acids (methyl naphthalene sodium sulfonate, Petro AA, Petrochemical Corporation); sulfated higher fatty acid monoglycerides such as the sodium salt of the sulfated monoglyceride of coco oil fatty acids and the potassium salt of the sulfated monoglyceride of tallow fatty acids; alkali metal salts of sulfated fatty alcohols containing from about 10 to 18 carbon atoms (e.g., sodium lauryl sulfate and sodium stearyl sulfate); sodium $C_{14}$–$C_{16}$-alpha-olefin sulfonates such as the Bio-Terge series (Stepan Chemical Co.); alkali metal salts of sulfated ethyleneoxy fatty alcohols (the sodium or ammonium sulfates of the condensation products of about 3 moles of ethylene oxide with a $C_{12}$–$C_{15}$ n-alkanol, i.e., the Neodol ethoxysulfates, Shell Chemical Co.); alkali metal salts of higher fatty esters of low molecular weight alkylol sulfonic acids, e.g. fatty acid esters of the sodium salt of isothionic acid, the fatty ethanolamide sulfates; the fatty acid amides of amino alkyl sulfonic acids, e.g. lauric acid amide of taurine; as well as numerous other anionic organic surface active agents such as sodium xylene sulfonate, sodium naphthalene sulfonate, sodium toulene sulfonate and mixtures thereof.

A further useful class of anionic surfactants includes the 8-(4-n-alkyl-2-cyclohexenyl)-octanoic acids wherein the cyclohexenyl ring is substituted with an additional carboxylic acid group. These compounds or their potassium salts, are commercially-available from Westvaco Corporation as Diacid 1550 or H-240.

In general these anionic surface active agents are employed in the form of their alkali metal salts, ammonium or alkaline earth metal salts, since these salts possess the requisite stability, solubility, and low cost essential to practical utility.

The preferred surface active agents are one or more nonionic surfactants which can optionally be combined with one or more anionic surfactants. However, one or more anionic surfactants can also be employed without any nonionic surfactant. Foaming is not desired and therefore the surfactants should be chosen, and their relative content set, so as to minimize foaming. The total amount of surfactants in the aqueous composition can range from about 0.1 to about 1 percent by weight, preferably from 0.2 to 0.6 percent by weight.

It is necessary that the pH of the extracted solution be on the alkaline side, within a range of about 8 to about 12, preferably from 9 to 11. By "extracted solution" is meant the aqueous solution which is deposited from the substrate onto the surface to be cleaned. This extracted solution can be identical to the solution which is impregnated into the substrate but, in many cases, the binding system in the substrate contains bonding agents and other additives which are acidic in nature and leach out into the solution causing a lowering of the pH. To ensure that the extracted pH is within the proper limits, it may be necessary to produce an aqueous solution with a pH higher than 12 and/or to add a buffering agent. In order to achieve the desired alkalinity level, a minor amount of ammonium, sodium or potassium hydroxide is added.

The preferred alkalinity control agent is ammonia, because of its grease cutting characteristics and because of its traditional characteristic "clean" odor when used in small amounts. If ammonia is used, the weight percent range is from about 0.01 to about 0.75 percent, preferably from 0.1 to 0.2 percent.

It is also desirable to employ, as a preservative, one or more bacteriostatic or fungistatic agents. This is especially desirable where a cellulosic substrate is employed. Examples of such preservatives include such well known products as methyl and propyl paraben, 5-chloro-2-methyl-4-isothiazolin-3-one and 2-methyl-4-isothiazolin-3-one (Kathon CG, Rohm & Haas), potassium benzoate, and 1-(3-chloroallyl)-3,5,7-triaza-1-azonia-adamantane (Dowicil 75). Since the major portion of the aqueous solution consists of water, it is important that the preservative be water soluble; a preferred preservative from this standpoint is 1-(3-chloroallyl)-3,5,7-triaza-1-azonia adamantane. If a preservative is used, it can be present in the range of from about 0.05 to about 0.3 weight percent, preferably from 0.1 to 0.2 weight percent, of the aqueous solution.

In addition to the solvent, surfactant and alkalinity agent, the aqueous solution preferably also contains a minor but effective amount of a fragrance selected so as to be chemically compatible with the other ingredients. Such fragrances are present in an amount ranging from about 0.02 to about 0.50 weight percent of the solution, preferably from 0.1 to 0.3 weight percent. These fragrances include floral oils such as rose oil, lilac, jasmine, wisteria, lemon, apple blossoms or compound bouquets such as spice, woody, oriental, and the like.

Additional optional ingredients which can be included in the aqueous solution include colorants and disinfectant. Again, in order to promote streak-free effectiveness, these optional ingredients must be water soluble.

The water used in the aqueous solution should preferably be distilled water. De-ionized water can also be used.

It is critical to the effectiveness of the subject semi-moist wipes that the aqueous detergent solution be loaded into the substrate at a level considerably less than its absorbence capacity. In general, the liquid loading level should not exceed about 75% of the substrate's absorbence capacity and preferably should not exceed 50% of the absorbence capacity. In order to function as a means for distributing the aqueous cleaning solution and as a means for completely absorbing bathroom soils, the substrate must have a significant amount of reserve absorbant capacity. For example, if a substrate has an absorbence capacity within the preferred range of 600% to 1000%, it can preferably be loaded with aqueous solution in an amount ranging from about 1.0 to about 4.0 times its weight, preferably from about 1.5 to about 3.0 times its weight. Using, as a specific example, a cellulosic substrate sheet of 8 inches by 10½ inches (20 cm by 27 cm) having a weight of 5 grams and an absorbence capacity of 40 grams (800%), a satisfactory loading level of aqueous solution would be from about 7.5 grams to about 15.0 grams (1.5 to 3.0 times the weight of the substrate). Below the lower loading level of 7.5 grams, satisfactory cleaning is not attained. At a loading above the upper level, the wipe does not readily absorb all the liquid deposited on the surface. A preferred loading level range for this particular substrate is from 8.5 grams to 11.5 grams (1.7 to 2.3 times the weight of the substrate), with about 10.0 grams (2.0 times weight of the substrate) being optimal. At these levels, there is enough cleaning solution to solubilize and pick up bathroom soils. Enough of the surface is covered in a single pass and the user has a perception of adequate cleaning action. Also, the excess "reservoir" capacity of the substrate works well as an uptake and effectively removes all the liquid and solid material leaving behind no residue. The preferred and optimum loading levels will vary according to the composition of the aqueous solution and, more significantly, according to the nature of the substrate. Thus, with a different substrate, the preferred loading level ranges may exceed or fall well short of the ranges for this specific example. The determination of suitable liquid loading levels for a particular substrate is well within the ability of persons skilled in the art.

The wipes of this invention, being of the moist impregnated type, must be packaged in such a way as to avoid the lost of volatile material by evaporation. The wipes may, for example, be packaged individually in moisture-proof sachets comprised of metal foil and/or plastic film. Alternatively, a continuous roll of moistened substrate, perforated at intervals, can be packaged in a container with a tight closure. The preferred method, particular for bathroom use, is to package the products as individual folded sheets in a container having the general shape of a tissue box and provided with a moisture imprevious closure means.

This invention will be further illustrated by the following non-limiting examples.

EXAMPLE 1

An aqueous solution was prepared which contained ingredients required or premitted in the practice of this invention, but which also contained two commonly-used detergent builders. The solution had the following composition.

| Ingredient | Function | Wt. % |
|---|---|---|
| Ethylene glycol monobutyl ether | Solvent | 2.0000 |
| Isopropyl alcohol | Solvent | .6000 |
| Polyethoxylated nonylphenol (12 moles E.O) (Hyponic NP-120, Diamond Shamrock) | Nonionic Surfactant | .6800 |
| Sodium hydroxide | Alkalinity | .0900 |
| Tetrasodium salt of ethylenediaminetetra-acetic acid (Versene 100, Dow Chemical) | Builder | .4000 |
| Sodium carbonate | Builder | .3600 |
| Perfume | Fragrance | .2000 |
| Acid Blue 80 | Colorant | .0003 |
| n-Alkyl dimethyl benzyl ammonium chlorides | Disinfectants | .3000 |
| n-Alkyl dimethyl ethyl benzyl ammonium chlorides (Onyx BTC 2125M) | | .3000 |
| Potassium benzoate | Preservative | .0200 |
| Distilled water | Diluent | 95.0497 |
| | | 100.0000 |

In Examples 2 through 8, aqueous solutions usable in the practice of this invention were prepared. These solutions had the following content.

EXAMPLE 2

| Ingredient | Function | Wt. % |
|---|---|---|
| Isopropyl alcohol | Solvent | 5.00 |
| Alcohol ethoxy-sulfate Salt (Neodol 25-3A, Shell Chemical) | Anionic Surfactant | .15 |
| Ammonium hydroxide | Alkalinity | .15 |
| Perfume | Fragrance | .20 |
| Distilled water | Diluent | 94.50 |
| | | 100.00 |

EXAMPLE 3

| Ingredient | Function | Wt. % |
|---|---|---|
| Isopropyl alcohol | Solvent | 5.00 |
| Alcohol ethoxy-sulfate salt (Neodol 25-3A, Shell Chemical) | Anionic Surfactant | .15 |
| Ammonium hydroxide | Alkalinity | .15 |
| Polymethylcyclo-siloxanes (Dow Corning 345 Fl., Dow Corning Corp.) | Shine | .10 |
| 5-chloro-2-methyl-4 isothiazolin-3-one and 2-methyl-4-isothiazolin-3 one (Kathon-CG, Rohm & Haas Co.) | Preservative | .05 |
| Perfume | Fragrance | .20 |

-continued

| Ingredient | Function | Wt. % |
| --- | --- | --- |
| Distilled water | Diluent | 94.35 |
| | | 100.00 |

EXAMPLE 4

| Ingredient | Function | Wt. % |
| --- | --- | --- |
| Isopropyl alcohol | Solvent | 5.00 |
| N—methyl-2-pyrrolidone | Solvent | 2.00 |
| Alcohol ethoxy-sulfate salt (Neodol 25-3A, Shell Chemical) | Anionic Surfactant | .15 |
| Ammonium hydroxide | Alkalinity | .15 |
| Perfume | Fragrance | .20 |
| Distilled water | Diluent | 92.50 |
| | | 100.00 |

EXAMPLE 5

| Ingredient | Function | Wt. % |
| --- | --- | --- |
| Dipropylene glycol methyl ether | Solvent | 3.00 |
| propylene glycol methyl ether | Solvent | 3.00 |
| Isopropyl alcohol | Solvent | 3.00 |
| Alcohol ethoxy-sulfate salt (Neodol 25-3A, Shell Chemical) | Anionic Surfactant | .15 |
| Ammonium hydroxide | Alkalinity | .15 |
| Perfume | Fragrance | .20 |
| Distilled water | Diluent | 90.50 |
| | | 100.00 |

EXAMPLE 6

| Ingredient | Function | Wt. % |
| --- | --- | --- |
| Isopropyl alcohol | Solvent | 15.00 |
| Alkylpolyglycoside (APG-300, Horizon Chemical) | Nonionic Surfactant | .45 |
| Ammonium hydroxide | Alkalinity | .15 |
| Perfume | Fragrance | .20 |
| 1-(3-Chloroallyl)-3,5,7-triaza-1-azonia adamantane (Dowicil 75, Dow Chemical) | Preservative | .15 |
| Distilled water | Diluent | 84.05 |
| | | 100.00 |

EXAMPLE 7

| Ingredient | Function | Wt. % |
| --- | --- | --- |
| Isopropyl alcohol | Solvent | 5.00 |
| Propylene glycol methyl ether | Solvent | 2.00 |
| Primay alkane sulfonate (Bio Terge PAS-8S, Stepan Company) | Anionic Surfactant | .15 |
| Ammonium hydroxide | Alkalinity | .15 |
| Perfume | Fragrance | .20 |
| Distilled water | Diluent | 92.50 |

-continued

| Ingredient | Function | Wt. % |
| --- | --- | --- |
| | | 100.00 |

EXAMPLE 8

| Ingredient | Function | Wt. % |
| --- | --- | --- |
| Isopropyl alcohol | Solvent | 5.00 |
| Propylene glycol methyl ether | Solvent | 2.00 |
| Primay alkane sulfonate (Bio Terge PAS-8S, Stepan Company) | Anionic Surfactant | .45 |
| Polymethylcyclo-siloxanes (Dow Corning 345 Fl., Dow Corning) | Shine | .10 |
| Ammonium hydroxide | Alkalinity | .15 |
| Perfume | Fragrance | .20 |
| Distilled water | Diluent | 92.10 |
| | | 100.00 |

EXAMPLE 9

An aqueous solution was prepared having the following ingredients permitted the aqueous solutions usable with the instant invention, but which lacked the required surfactant.

| Ingredient | Function | Wt. % |
| --- | --- | --- |
| Isopropyl alcohol | Solvent | 25.00 |
| Ethanol 190 (denatured) | Solvent | 25.00 |
| Ammonium hydroxide | Alkalinity | 0.15 |
| Perfume | Fragrance | 0.10 |
| Distilled water | Diluent | 49.75 |
| | | 100.00 |

EXAMPLE 10

Towelettes were prepared by loading 10 grams each of the solutions prepared according to Examples 1 through 9 onto cellulose sheets weighing about 5 grams and having dimensions about 8 inches by 10½ inches (20 cm by 27 cm). The cellulose sheets are grade 852, air lay nonwoven paper from Fort Howard Paper Company. These towelettes were tested in the following manner.

A 12 inch by 4 inch (30 cm by 10 cm) black ceramic tile was stroked three times by the moistened towelette, each stroke consisting of an upward and a downward uniform application. The tiles were permitted to dry for about 5 minutes and then rated on a scale of 0 to 10, with 0 being excellent and free of streaks and film, and 10 being extremely hazy, dull and covered with streaks.

The following table shows the results.

| | |
| --- | --- |
| Example 1 = | 10.0 |
| Example 2 = | 1.0 |
| Example 3 = | 0.5-1.0 |
| Example 4 = | 1.0 |
| Example 5 = | 0.5 |
| Example 6 = | 0-0.5 |
| Example 7 = | 1.0 |
| Example 8 = | 0.5 |
| Example 9 = | 5.0 |

It can readily be seen that the wipes prepared according to this invention, Example 2 through 8, gave excellent streak-free results, while those of Examples 1 and 9 were unsatisfactory.

We claim:

1. A disposable article for cleaning hard surfaces comprising, as non-woven substrate, a fibrous sheet consisting essentially of cellulosic material, rayon, polyolefins, polyester, nylon or mixtures thereof, and having a maximum absorbence capacity for water of at least 200 weight percent, said substrate being impregnated to a level not exceeding about 75% of its maximum absorbence capacity with an aqueous solution comprising from about 0.1 to about 1% by weight of at least one nonionic surfactant, at least one anionic surfactant, or a mixture of nonionic and anionic surfactants from about 0.2 to about 25% by weight of a water miscible solvent for oils, and ammonium or an alkali metal hydroxide as an alkalinity agent in an amount sufficient to cause the pH of the extracted solution to be within the range from 8 to 12.

2. A disposable article according to claim 1, in which the substrate is impregnated with the aqueous solution to a level not exceeding 50% of its maximum absorbence capacity.

3. A disposable article according to claim 2, in which the substrate has a basis weight of between about 1 and about 4.5 ounces per square yard.

4. A disposable article according to claim 3, in which the basis weight is from 1.5 to 3.5 ounces per square yard.

5. A disposable article according to claim 3, in which the substrate consists essentially of cellulosic material or of a blend of cellulosic material with a material selected from the group consisting of rayon, polyolefin, polyester, nylon and mixtures thereof.

6. A disposable article according to claim 5, in which the substrate consists essentially of cellulosic material.

7. A disposable article according to claim 6, in which the substrate has a basis weight of from 1.5 to 3.5 ounces per square yard, the aqueous composition contains additionally a preservative in an amount of from about 0.05 to about 0.3 weight percent and is impregnated into the solution at a level of 1.5 to 3.0 times the weight of the substrate, the solvent is isopropanol which is present in an amount of from 9 to 18 weight percent of the aqueous composition, the surfactant is a alkyl polyglycolside and the alkalinity agent is ammonium hydroxide.

8. A disposable article according to claim 5, in which the substrate has a basis weight of from 1.5 to 3.5 ounces per square yard.

9. A disposable article according to claim 8, in which the maximum absorbence capacity of the substrate is from 600 to 1000 weight percent.

10. A disposable article according to claim 9, in which the substrate is impregnated with the aqueous solution at a loading level range of from about 1.5 to about 3.0 times the weight of the substrate.

11. A disposable article according to claim 5, which additionally contains a preservative in an amount between about 0.05 and about 0.3 weight percent of the aqueous composition.

12. A disposable article according to claim 3, in which the substrate consists essentially of rayon or of a blend of rayon selected from the group consisting of polyolefin, polyester, nylon and mixtures thereof.

13. A disposable article according to claim 12, in which the substrate is a blend of from about 40 to about 70 weight percent rayon and from about 30 to about 60 weight percent of polyolefin.

14. A disposable article according to claim 13, in which the polyolefin is polypropylene.

15. A disposable article according to claim 2, in which the maximum absorbence capacity is from about 300 to about 1200 weight percent.

16. A disposable article according to claim 15, in which the maximum absorbence capacity is from about 600 to about 1000 weight percent.

17. A disposable article according to claim 2, in which the surfactants are nonionic surfactants.

18. A disposable article according to claim 17, in which the surfactant is an alkyl polyglycoside.

19. A disposable article according to claim 2, in which the surfactants are anionic surfactants.

20. A disposable article according to claim 19, in which the surfactant is an ammonium or sodium salt of sulfated ethyleneoxy fatty alcohols.

21. A disposable article according to claim 2, in which the surfactant is present in an amount ranging from 0.2 to 0.6 weight percent of the aqueous composition.

22. A disposable article according to claim 2, in which the solvent is selected from the group consisting of aliphatic alcohols having from 1 to 4 carbon atoms, tetrahydrofurfurol, glycols and glycols ethers having from 2 to 8 carbon atoms, volatile silicones and mixtures thereof.

23. A disposable article according to claim 22, in which the solvent is a $C_2$ or $C_3$ alcohol.

24. A disposable article according to claim 23, in which the solvent is isopropanol.

25. A disposable article according to claim 22, in which the solvent is present in an amount of from 9 to 18 weight percent of the aqueous composition.

26. A disposable article according to claim 2, in which sufficient alkalinity agent is added to the aqueous composition to maintain the pH of the extracted solution at a level from 9 to 11.

27. A disposable article according to claim 26, in which the alkalinity agent is ammonium hydroxide or sodium hydroxide.

28. A disposable article according to claim 27, in which the alkalinity agent is ammonium hydroxide.

29. A disposable article according to claim 2, in which additionally contains a preservative.

* * * * *